United States Patent
Nobutoki

(10) Patent No.: US 11,814,567 B2
(45) Date of Patent: Nov. 14, 2023

(54) HEAT STORAGE MATERIAL, METHOD OF PRODUCING SAME, AND HEAT STORAGE TANK

(71) Applicant: MITSUBISHI ELECTRIC CORPORATION, Chiyoda-ku (JP)

(72) Inventor: Hideharu Nobutoki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 757 days.

(21) Appl. No.: 16/971,172

(22) PCT Filed: Mar. 26, 2019

(86) PCT No.: PCT/JP2019/012764
§ 371 (c)(1),
(2) Date: Aug. 19, 2020

(87) PCT Pub. No.: WO2019/194022
PCT Pub. Date: Oct. 10, 2019

(65) Prior Publication Data
US 2020/0392390 A1 Dec. 17, 2020

(30) Foreign Application Priority Data

Apr. 5, 2018 (JP) .................................. 2018-072948

(51) Int. Cl.
*C09K 5/14* (2006.01)
*C08F 2/10* (2006.01)
*C08F 220/56* (2006.01)

(52) U.S. Cl.
CPC .................. *C09K 5/14* (2013.01); *C08F 2/10* (2013.01); *C08F 220/56* (2013.01)

(58) Field of Classification Search
CPC . C09K 5/14; C08F 2/10; C08F 220/56; C08F 220/54; C08F 222/385; C08F 220/20
USPC .................................................... 252/71, 68
See application file for complete search history.

(56) References Cited

U.S. PATENT DOCUMENTS

| 10,662,295 | B2* | 5/2020 | Maynard ................. A61P 43/00 |
| 2005/0106392 | A1 | 5/2005 | Sano et al. |
| 2014/0010960 | A1 | 1/2014 | Shibata et al. |
| 2015/0291868 | A1 | 10/2015 | Rajagopalan et al. |
| 2016/0144342 | A1 | 5/2016 | Watanabe et al. |
| 2019/0233697 | A1* | 8/2019 | Novek ................... F25J 1/0211 |
| 2019/0316017 | A1* | 10/2019 | Seppälä ................ F28D 20/028 |
| 2020/0231857 | A1* | 7/2020 | Altay ..................... C08K 5/101 |
| 2022/0259475 | A1* | 8/2022 | Nobutoki ................. C09K 5/10 |

FOREIGN PATENT DOCUMENTS

| CN | 1844553 A | 10/2006 |
| CN | 101712736 A | 5/2010 |
| CN | 105440214 A | 3/2016 |
| CN | 107828014 A | 3/2018 |
| JP | 5-164424 A | 6/1993 |
| JP | 2003-268359 A | 9/2003 |
| JP | 2007-44673 A | 2/2007 |
| JP | 2016-97359 A | 5/2016 |
| WO | WO 2014/091938 A1 | 6/2014 |

OTHER PUBLICATIONS

International Search Report dated Jun. 18, 2019 in PCT/JP2019/012764 filed Mar. 26, 2019, 1 page.
Office Action dated May 24, 2021, in corresponding Chinese patent Application No. 201980023447.1, 30 pages.
A. C. C. Rotzetter et al: "Thermoresponsive Polymer Induced Sweating Surfaces as an Efficient Way to Passively Cool Buildings", Advanced Materials, vol. 24, No. 39, Oct. 9, 2012 (Oct. 9, 2012), pp. 5352-5356, XP055299793.
Extended European Search Report dated Mar. 26, 2021 in European Application No. 19782341.2.

* cited by examiner

*Primary Examiner* — Douglas J McGinty
(74) *Attorney, Agent, or Firm* — XSENSUS LLP

(57) ABSTRACT

Provided is a heat storage material, consisting of a thermo-sensitive polymer gel formed of a thermo-sensitive polymer and a solvent selected from the group consisting of water, an organic solvent, and a mixture thereof, wherein the hydrophilicity and hydrophobicity of the heat storage material reversibly change to each other across the lower critical solution temperature thereof, and in the process of the change, the solvent in the thermo-sensitive polymer gel maintains a liquid state.

8 Claims, No Drawings

HEAT STORAGE MATERIAL, METHOD OF PRODUCING SAME, AND HEAT STORAGE TANK

TECHNICAL FIELD

The present invention relates to a heat storage material, a method of producing the material, and a heat storage tank.

BACKGROUND ART

Most of low-temperature exhaust heat at about 120° C. or less has been discharged from facilities each including a heat source, such as a household, an office, a factory, and a waste treatment facility, without being utilized. To effectively utilize the unutilized heat, a material that can store low-temperature exhaust heat at a high density has been required. When such heat storage material is used, it is convenient and preferred to use water under normal pressure as a heat medium. Accordingly, the melting point of the heat storage material is preferably 100° C. or less. An inorganic heat storage material is, for example, an inorganic hydrated salt, such as barium hydroxide octahydrate (melting point: 78° C.) or magnesium nitrate hexahydrate (melting point: 89° C.) However, each of barium hydroxide octahydrate and magnesium nitrate hexahydrate has not been put into practical use because barium hydroxide octahydrate is designated as a deleterious substance, and magnesium nitrate hexahydrate involves a problem of metal corrosion. Meanwhile, an organic heat storage material is, for example, a paraffin, a fatty acid, or a sugar alcohol. However, those organic heat storage materials have not been put into practical use because the materials each have a small heat storage density derived from heat of fusion.

In recent years, a heat storage material utilizing a hydrogel has been known. The heat storage material maintains non-fluidity even in a temperature region of its phase transition temperature or more, and can stably maintain non-fluidity even when a cooling-heating operation passing the phase transition temperature is repeated. As such heat storage material, in, for example, Patent Document 1, there is a description of a heat storage material including: a first gelling material produced by crosslinking at least one kind selected from a polyacrylamide derivative, polyvinyl alcohol, sodium polyacrylate, and sodium polymethacrylate; a second gelling material that is a polysaccharide, agar, or gelatin; and an inorganic or aqueous heat-storing material held in the first gelling material and the second gelling material.

CITATION LIST

Patent Document

Patent Document 1: WO 2014/091938 A1

SUMMARY OF INVENTION

Technical Problem

The heat storage material described in Patent Document 1 has a relatively low heat storage operation temperature. However, the material has involved a problem in that its heat storage density is small, and hence a heat storage tank becomes large.

Therefore, the present invention has been made to solve such problem as described above, and an object of the present invention is to provide a heat storage material having a relatively low heat storage operation temperature and a large heat storage density.

Solution to Problem

According to one embodiment of the present invention, there is provided a heat storage material, consisting of a thermo-sensitive polymer gel formed of a thermo-sensitive polymer and a solvent selected from the group consisting of water, an organic solvent, and a mixture thereof, wherein hydrophilicity and hydrophobicity of the heat storage material reversibly change to each other across a lower critical solution temperature thereof, and in a process of the change, the solvent in the thermo-sensitive polymer gel maintains a liquid state.

According to one embodiment of the present invention, there is provided a heat storage material, consisting of a thermo-sensitive polymer gel containing:

a constituent unit represented by the following general formula (1):

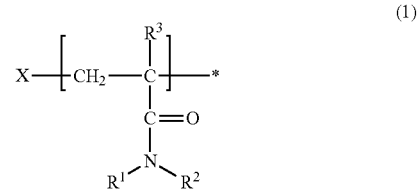

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ may be identical to or different from each other, $R^3$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, and * represents a covalent bonding site; and a constituent unit represented by the following general formula (2):

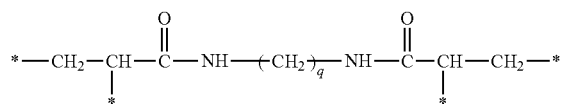

where * represents a covalent bonding site, and q represents an integer of from 1 to 3, the thermo-sensitive polymer gel having a crosslinked structure in which a covalent bonding site of the constituent unit represented by the general formula (1) and a covalent bonding site of the constituent unit represented by the general formula (2) are bonded to each other, the thermo-sensitive polymer gel having a molar ratio among the constituent unit represented by the general formula (1), X that represents the functional group, and the constituent unit represented by the general formula (2) of from 99:0.5:0.5 to 70:23:7, wherein hydrophilicity and hydrophobicity of the heat storage material reversibly change to each other across a lower critical solution temperature thereof.

According to one embodiment of the present invention, there is provided a heat storage material, consisting of a thermo-sensitive polymer gel containing:

a constituent unit represented by the following general formula (1):

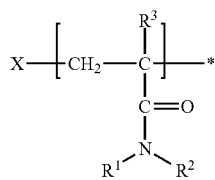
(1)

a constituent unit represented by the following general formula (2):

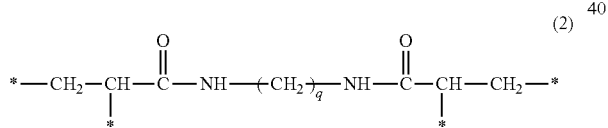
(2)

where * represents a covalent bonding site, and q represents an integer of from 1 to 3; and a constituent unit represented by the following general formula (3):

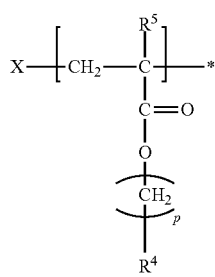
(3)

or the following general formula (4):

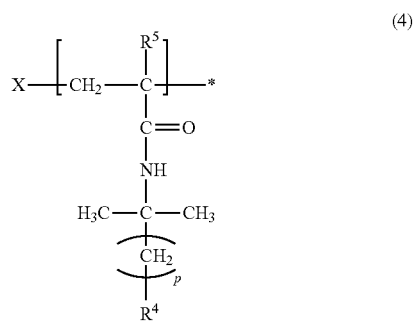
(4)

where $R^4$ represents a hydroxy group, a carboxyl group, a sulfonic acid group, or a phosphoric acid group, $R^5$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, * represents a covalent bonding site, and p represents an integer of from 1 to 3, the thermo-sensitive polymer gel having a crosslinked structure in which a covalent bonding site of the constituent unit represented by the general formula (1), a covalent bonding site of the constituent unit represented by the general formula (2), and a covalent bonding site of the constituent unit represented by the general formula (3) or the general formula (4) are bonded to each other, the thermo-sensitive polymer gel having a molar ratio between the constituent unit represented by the general formula (1) and the constituent unit represented by the general formula (3) or the general formula (4) of from 95:5 to 20:80, the thermo-sensitive polymer gel having a molar ratio among a total of the constituent unit represented by the general formula (1) and the constituent unit represented by the general formula (3) or the general formula (4), Xs that represent the functional groups, and the constituent unit represented by the general formula (2) of from 99:0.5:0.5 to 70:23:7, wherein hydrophilicity and hydrophobicity of the heat storage material reversibly change to each other across a lower critical solution temperature thereof.

Advantageous Effects of Invention

According to the present invention, the heat storage material having a relatively low heat storage operation temperature and a large heat storage density can be provided.

DESCRIPTION OF EMBODIMENTS

First Embodiment

A heat storage material according to a first embodiment consists of a thermo-sensitive polymer gel formed of a thermo-sensitive polymer and a solvent selected from the group consisting of water, an organic solvent, and a mixture thereof. The hydrophilicity and hydrophobicity of the heat storage material reversibly change to each other across the lower critical solution temperature thereof, and in the process of the change, the solvent in the thermo-sensitive polymer gel maintains a liquid state without evaporating.

The thermo-sensitive polymer is not particularly limited as long as the hydrophilicity and hydrophobicity thereof reversibly change to each other across the lower critical solution temperature thereof, and examples thereof may include a partially acetified product of polyvinyl alcohol, polyvinyl methyl ether, methyl cellulose, polyethylene oxide, polyvinylmethyloxazolidinone, poly-N-ethylacrylamide, poly-N-ethylmethacrylamide, poly-N-n-propylacrylamide, poly-N-n-propylmethacrylamide, poly-N-isopropylacrylamide, poly-N-isopropylmethacrylamide, poly-N-cyclopropylacrylamide, poly-N-cyclopropylmethacrylamide, poly-N-methyl-N-ethylacrylamide, poly-N,N-diethylacrylamide, poly-N-methyl-N-isopropylacrylamide, poly-N-methyl-N-n-propylacrylamide, poly-N-acryloylpyrrolidine, poly-N-acryloylpiperidine, poly-N-2-ethoxyethylacrylamide, poly-N-2-ethoxyethylmethacrylamide, poly-N-3-methoxypropylacrylamide, poly-N-3-methoxypropylmethacrylamide, poly-N-3-ethoxypropylacrylamide, poly-N-3-ethoxypropylmethacrylamide, poly-N-3-isopropoxypropylacrylamide, poly-N-3-isopropoxypropylmethacrylamide, poly-N-3-(2-methoxyethoxy)propylacrylamide, poly-N-3-(2-methoxyethoxy)propylmethacrylamide, poly-N-tetrahydrofurfurylacrylamide, poly-N-tetrahydrofurfurylmethacrylamide, poly-N-1-methyl-2-methoxyethylacrylamide, poly-N-1-methyl-2-methoxyethylmethacrylamide, poly-N-1-methoxymethylpropylacrylamide, poly-N-1-methoxymethylpropylmethacrylamide, poly-N-(2,2-dimethoxyethyl)-N-methylacrylamide, poly-N-(1,3-dioxolan-2-ylmethyl)-N-methylacrylamide, poly-N-8-acryloyl-1,4-dioxa-8-aza-spiro[4,5]decane, poly-N-2-methoxyethyl-N-ethylacrylamide, poly-N-2-methoxyethyl-N-n-propylacrylamide, poly-N-2-methoxyethyl-N-isopropylacrylamide, and poly-N,N-di(2-methoxyethyl) acrylamide.

Of those thermo-sensitive polymers, a thermo-sensitive polymer having the following features is preferred: the thermo-sensitive polymer has a crosslinked structure unit, and has, at a molecular terminal thereof, one or more kinds of functional groups selected from the group consisting of a hydroxy group, a sulfonic acid group, an oxysulfonic acid group, a phosphoric acid group, and an oxyphosphoric acid group; and a molar ratio among a repeating unit for forming the thermo-sensitive polymer, the functional group, and the crosslinked structure unit is from 99:0.5:0.5 to 70:20:10, more preferably from 98:1:1 to 75:17:8. In the case where the ratio of the repeating unit for forming the thermo-sensitive polymer is excessively large (in the case where the ratio of the repeating unit is more than 99 mol % when the total of the repeating unit, the functional group, and the crosslinked structure unit is set to 100 mol %), the heat storage density of the heat storage material reduces. On the other hand, in the case where the ratio of the repeating unit for forming the thermo-sensitive polymer is excessively small (in the case where the ratio of the repeating unit is less than 70 mol % when the total of the repeating unit, the functional group, and the crosslinked structure unit is set to 100 mol %), the material does not show any lower critical solution temperature (LCST).

The crosslinked structure unit is a structure unit introduced by using a crosslinking agent (sometimes referred to as "crosslinkable monomer") at the time of the production of the thermo-sensitive polymer, such as a partially acetified product of polyvinyl alcohol or polyvinyl methyl ether, described above. The crosslinking agent is not particularly limited, and examples thereof include N,N'-methylenebisacrylamide, N,N'-diallylacrylamide, N,N'-diacryloylimide, N,N'-dimethacryloylimide, triallylformal, diallyl naphthalate, ethylene glycol diacrylate, ethylene glycol dimethacrylate, polyethylene glycol di(meth)acrylate, propylene glycol diacrylate, propylene glycol dimethacrylate, polypropylene glycol di(meth)acrylate, 1,3-butylene glycol diacrylate, 1,3-butylene glycol dimethacrylate, 1,4-butylene glycol dimethacrylate, butylene glycol di(meth)acrylate, glycerol dimethacrylate, neopentyl glycol dimethacrylate, trimethylolpropane triacrylate, trimethylolpropane trimethacrylate, tetramethylolmethane tetramethacrylate, and divinyl derivatives, such as divinylbenzene.

Examples of the organic solvent include a polar organic solvent, a nonpolar organic solvent, and an oil. When the oil is used, the organic solvent is sometimes referred to as "lipophilic solvent".

Specific examples of the polar organic solvent include: alcohols, such as methanol, ethanol, propanol, isopropanol, isopentanol, and 2-methoxyethanol; ketones, such as acetone, methyl ethyl ketone, methyl n-propyl ketone, methyl isopropyl ketone, and methyl isoamyl ketone; ethers, such as ethylene glycol monobutyl ether and propylene glycol monomethyl ether; and methyl acetate, ethyl acetate, propyl acetate, n-butyl acetate, chloroform, acetonitrile, glycerol, dimethyl sulfoxide, N,N-dimethylformamide, tetrahydrofuran, pyridine, 1,4-dioxane, dimethylacetamide, N-methylpyrrolidone, and propylene carbonate. Those polar organic solvents may be used alone or as a mixture thereof.

Specific examples of the nonpolar organic solvent include benzene, chlorobenzene, o-dichlorobenzene, toluene, o-xylene, dichloromethane, 1,1,2-trichlorotrifluoroethane, pentane, cyclopentane, hexane, cyclohexane, heptane, isooctane, diethyl ether, petroleum ether, pyridine, carbon tetrachloride, a fatty acid, and a fatty acid ester. Those nonpolar organic solvents may be used alone or as a mixture thereof.

Specific examples of the oil include a vegetable oil, an essential oil, a petrochemical oil, and a synthetic oil. Those oils may be used alone or as a mixture thereof.

According to this embodiment, the heat storage material having a relatively low heat storage operation temperature and a large heat storage density can be provided.

Second Embodiment

A heat storage material according to a second embodiment consists of a thermo-sensitive polymer gel containing:
a constituent unit represented by the following general formula (1):

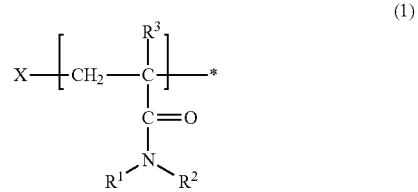

(1)

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ may be identical to or different from each other, $R^3$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, and * represents a covalent bonding site; and a constituent unit represented by the following general formula (2):

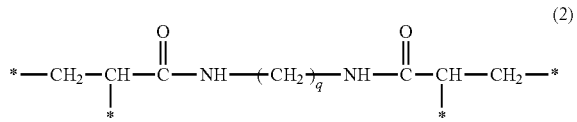

where * represents a covalent bonding site, and q represents an integer of from 1 to 3, the thermo-sensitive polymer gel having a crosslinked structure in which a covalent bonding site of the constituent unit represented by the general formula (1) and a covalent bonding site of the constituent unit represented by the general formula (2) are bonded to each other.

The term "thermo-sensitive polymer" as used herein means a polymer that has a lower critical solution temperature (LCST) with respect to water, that shows hydrophilicity at temperatures lower than the LCST, and that shows hydrophobicity at temperatures higher than the LCST, in other words, a polymer whose hydrophilicity and hydrophobicity reversibly change to each other across the lower critical solution temperature.

In the heat storage material of this embodiment, a molar ratio among the constituent unit represented by the general formula (1), X that represents the functional group, and the constituent unit represented by the general formula (2) is from 99:0.5:0.5 to 70:23:7, preferably from 98:1:1 to 77:18:5. In the case where the ratio of the constituent unit represented by the general formula (1) is excessively large (in the case where the ratio of the constituent unit represented by the general formula (1) is more than 99 mol % when the total of the constituent unit represented by the general formula (1), X that represents the functional group, and the constituent unit represented by the general formula (2) is set to 100 mol %), the heat storage density of the material reduces. On the other hand, in the case where the ratio of the constituent unit represented by the general formula (1) is excessively small (in the case where the ratio of the constituent unit represented by the general formula (1) is less than 70 mol % when the total of the constituent unit represented by the general formula (1), X that represents the functional group, and the constituent unit represented by the general formula (2) is set to 100 mol %), the material does not show any LCST. In this description, the molar ratio among the constituent unit represented by the general formula (1), X that represents the functional group, and the constituent unit represented by the general formula (2) is a theoretical value calculated from raw material loading amounts.

The heat storage material of this embodiment only needs to include the constituent unit represented by the general formula (1), X that represents the functional group, and the constituent unit represented by the general formula (2) at the above-mentioned molar ratio, and the number of repetitions of the constituent unit represented by the general formula (1) and the order in which the respective constituent units are bonded to each other are not particularly limited. The number of repetitions of the constituent unit represented by the general formula (1) is typically an integer in the range of from 5 to 500.

In the heat storage material of this embodiment, the LCST may be set within a wide range of from 5° C. to 80° C. mainly in accordance with the kinds of $R^1$ and $R^2$ in the general formula (1). $R^1$ in the general formula (1) preferably represents a hydrogen atom or a methyl group from the viewpoint of further improving the temperature responsiveness of the material. $R^2$ in the general formula (1) preferably represents an ethyl group, a methyl group, or an isopropyl group from the viewpoint of further improving the temperature responsiveness. In addition, $R^3$ in the general formula (1) preferably represents a hydrogen atom from the viewpoint that the production of the thermo-sensitive polymer gel is facilitated. X in the general formula (1) may represent a functional group selected from the group consisting of a hydroxy group, a sulfonic acid group, an oxysulfonic acid group, a phosphoric acid group, and an oxyphosphoric acid group so that the above-mentioned molar ratio may be satisfied. Of those functional groups, an oxysulfonic acid group is preferred from the viewpoint of further improving the radical polymerizability of the constituent unit represented by the general formula (1). q in the general formula (2) preferably represents 1 from the viewpoint of further improving the heat storage density of the material. The covalent bonding sites in the general formulae (1) and (2) may bond constituent units of the same kind to each other, or may bond constituent units of different kinds to each other; in addition, part of the covalent bonding sites may form a branched structure. The branched structure is not particularly limited.

The heat storage material of this embodiment may be produced by subjecting a polymerizable monomer represented by the following general formula (5):

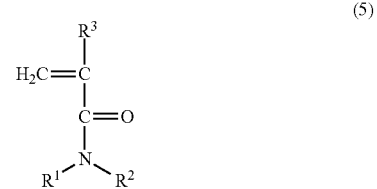

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ may be identical to or different from each other, and $R^3$ represents a hydrogen atom or a methyl group, to radical polymerization in the presence of a crosslinking agent represented by the following general formula (6):

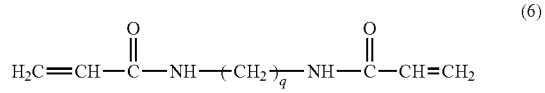

where q represents an integer of from 1 to 3, and one or more kinds of polymerization initiators selected from the group consisting of potassium persulfate, sodium persulfate, ammonium persulfate, potassium perphosphate, and hydrogen peroxide.

Specific examples of the polymerizable monomer represented by the general formula (5) (polymerizable monomer for providing the constituent unit represented by the general formula (1)) include N-ethyl(meth)acrylamide, N-n-propyl (meth)acrylamide, N-isopropyl(meth)acrylamide, N-cyclopropyl(meth)acrylamide, N,N-dimethyl(meth)acrylamide, N-ethyl-N-methyl(meth)acrylamide, N-methyl-N-n-propyl (meth)acrylamide, N-isopropyl-N-methyl(meth)acrylamide, N,N-diethyl(meth)acrylamide, N-ethoxyethyl(meth)acrylamide, N-ethyl-N-methoxyethyl(meth)acrylamide, N-methoxypropyl(meth)acrylamide, N-ethoxypropyl(meth)acrylamide, N-isopropoxypropyl(meth)acrylamide, N-methoxyethoxypropyl(meth)acrylamide, N-1-methyl-2-methoxyethyl(meth)acrylamide, N-1-methoxymethylpropyl (meth)acrylamide, N-(2,2-dimethoxyethyl)-N-methyl(meth) acrylamide, and N,N-dimethoxyethyl(meth)acrylamide. Of those, N-alkyl (C1-C3) (meth)acrylamides are preferred, and N-isopropyl(meth)acrylamide is more preferred. Herein, the term "(meth)acryl" refers to methacryl or acryl.

Specific examples of the crosslinking agent represented by the general formula (6) (crosslinking agent for providing the constituent unit represented by the general formula (2)) include N,N'-methylenebisacrylamide, N,N'-ethylenebisacrylamide, and N,N'-(trimethylene)bisacrylamide.

A radical polymerization method is not particularly limited, and a known method, such as a bulk polymerization method, a solution polymerization method, or an emulsion polymerization method, may be used. Of the above-mentioned polymerization initiators, potassium persulfate and ammonium persulfate are preferred from the viewpoint that the initiators each have satisfactory reactivity. In addition, combined use of a polymerization accelerator, such as N,N,N',N'-tetramethylethylenediamine or N,N-dimethylparatoluidine, and any one of the above-mentioned polymerization initiators enables rapid radical polymerization at low temperatures.

A solvent to be used in the radical polymerization is not particularly limited, and examples thereof include water, methanol, ethanol, n-propanol, isopropanol, 1-butanol, isobutanol, hexanol, benzene, toluene, xylene, chlorobenzene, dichloromethane, chloroform, carbon tetrachloride, acetone, methyl ethyl ketone, tetrahydrofuran, dioxane, acetonitrile, dimethyl sulfoxide, N,N-dimethylformamide, and N,N-dimethylacetamide. Of those solvents, water is preferred from the viewpoint of further improving the heat storage density of the heat storage material. In normal cases, the radical polymerization reaction only needs to be performed at a temperature of from 0° C. to 100° C. for from 30 minutes to 24 hours.

In addition, when the radical polymerization is performed by using water as a solvent, the total concentration of the polymerizable monomer represented by the general formula (5), the crosslinking agent represented by the general formula (6), and the polymerization initiator is particularly preferably set to from 2 mol/L to 3 mol/L from the viewpoint of further improving the heat storage density of the heat storage material. When the total concentration is less than 2 mol/L, the heat storage density of the heat storage material to be obtained may reduce. On the other hand, when the total concentration is more than 3 mol/L, the heat storage material to be obtained may not show any LCST.

Although the reason why the heat storage material of this embodiment can achieve a relatively low heat storage operation temperature (100° C. or less) and a large heat storage density is unclear, the reason is considered to be as described below. A thermo-sensitive polymer having a LCST shows hydrophilicity at temperatures lower than the LCST, and shows hydrophobicity at temperatures higher than the LCST. The thermo-sensitive polymer for forming the heat storage material of this embodiment has a high crosslink density, and has an advanced crowded structure in which a terminal of the polymer is branched. Accordingly, the molecules of water adsorbing to the thermo-sensitive polymer are aligned to a high degree as in a related-art thermo-sensitive polymer, but the degree of the alignment reduces at temperatures higher than the LCST. The thermo-sensitive polymer for forming the heat storage material of this embodiment can not only show a low heat storage operation temperature as in the related-art thermo-sensitive polymer, but also achieve a large heat storage density probably because the alignment property largely changes.

According to this embodiment, the heat storage material having a relatively low heat storage operation temperature and a large heat storage density, and the method of producing the material can be provided. The heat storage material according to this embodiment is suitable for a housing application because the heat storage material has a relatively low heat storage operation temperature and a large heat storage density, and hence a heat storage tank filled with the heat storage material can be downsized.

Third Embodiment

A heat storage material according to a third embodiment consists of a thermo-sensitive polymer gel containing:

a constituent unit represented by the following general formula (1):

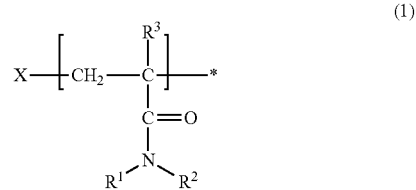

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ may be identical to or different from each other, $R^3$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, and * represents a covalent bonding site; and a constituent unit represented by the following general formula (2):

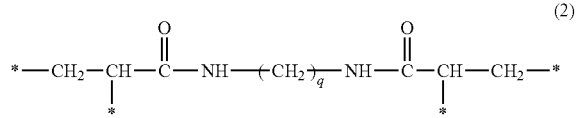

where * represents a covalent bonding site, and q represents an integer of from 1 to 3; and a constituent unit represented by the following general formula (3):

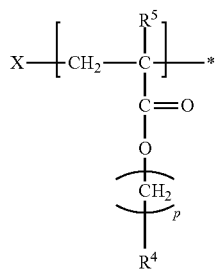

(3)

or the following general formula (4):

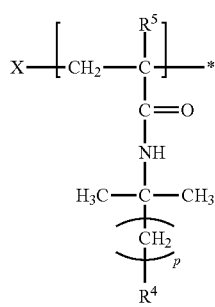

(4)

where $R^4$ represents a hydroxy group, a carboxyl group, a sulfonic acid group, or a phosphoric acid group, $R^5$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, * represents a covalent bonding site, and p represents an integer of from 1 to 3, the thermo-sensitive polymer gel having a crosslinked structure in which a covalent bonding site of the constituent unit represented by the general formula (1), a covalent bonding site of the constituent unit represented by the general formula (2), and a covalent bonding site of the constituent unit represented by the general formula (3) or the general formula (4) are bonded to each other.

In the heat storage material of this embodiment, a molar ratio between the constituent unit represented by the general formula (1) and the constituent unit represented by the general formula (3) or the general formula (4) is from 95:5 to 20:80, preferably from 85:15 to 25:75. In the case where the ratio of the constituent unit represented by the general formula (1) is excessively large (in the case where the ratio of the constituent unit represented by the general formula (1) is more than 95 mol % when the total of the constituent unit represented by the general formula (1) and the constituent unit represented by the general formula (3) or the general formula (4) is set to 100 mol %), the heat storage density of the material reduces. On the other hand, in the case where the ratio of the constituent unit represented by the general formula (1) is excessively small (in the case where the ratio of the constituent unit represented by the general formula (1) is less than 20 mol % when the total of the constituent unit represented by the general formula (1) and the constituent unit represented by the general formula (3) or the general formula (4) is set to 100 mol %), the material does not show any LCST.

In the heat storage material of this embodiment, a molar ratio among the total of the constituent unit represented by the general formula (1) and the constituent unit represented by the general formula (3) or the general formula (4), Xs that represent the functional groups, and the constituent unit represented by the general formula (2) is from 99:0.5:0.5 to 70:23:7, preferably from 98:1:1 to 77:18:5. In the case where the total ratio of the constituent unit represented by the general formula (1) and the constituent unit represented by the general formula (3) or the general formula (4) is excessively large (in the case where the total ratio of the constituent unit represented by the general formula (1) and the constituent unit represented by the general formula (3) or the general formula (4) is more than 99 mol % when the total of the total of the constituent unit represented by the general formula (1) and the constituent unit represented by the general formula (3) or the general formula (4), Xs that represent the functional groups, and the constituent unit represented by the general formula (2) is set to 100 mol %), the heat storage density of the material reduces. On the other hand, in the case where the total ratio of the constituent unit represented by the general formula (1) and the constituent unit represented by the general formula (3) or the general formula (4) is excessively small (in the case where the total ratio of the constituent unit represented by the general formula (1) and the constituent unit represented by the general formula (3) or the general formula (4) is less than 70 mol % when the total of the total of the constituent unit represented by the general formula (1) and the constituent unit represented by the general formula (3) or the general formula (4), Xs that represent the functional groups, and the constituent unit represented by the general formula (2) is set to 100 mol %), the material does not show any LCST. In this description, the molar ratio among the total of the constituent unit represented by the general formula (1) and the constituent unit represented by the general formula (3) or the general formula (4), Xs that represent the functional groups, and the constituent unit represented by the general formula (2) is a theoretical value calculated from raw material loading amounts.

The heat storage material of this embodiment only needs to include the constituent unit represented by the general formula (1), the constituent unit represented by the general formula (3) or the general formula (4), Xs that represent the functional groups, and the constituent unit represented by the general formula (2) at the above-mentioned molar ratio, and the number of repetitions of each of the constituent unit represented by the general formula (1) and the constituent unit represented by the general formula (3) or the general formula (4), and the order in which the respective constituent units are bonded to each other are not particularly limited. The number of repetitions of each of the constituent unit represented by the general formula (1) and the constituent unit represented by the general formula (3) or the general formula (4) is typically an integer in the range of from 5 to 500.

In the heat storage material of this embodiment, the LCST may be set within a wide range of from 5° C. to 80° C. mainly in accordance with the molar ratio between the constituent unit represented by the general formula (1) and the constituent unit represented by the general formula (3) or the general formula (4), the kinds of $R^1$ and $R^2$ in the general formula (1), and the kinds of $R^4$ and $R^5$ in the general formula (3) or the general formula (4). $R^1$ in the general formula (1) preferably represents a hydrogen atom or a methyl group from the viewpoint of further improving the temperature responsiveness of the material. $R^2$ in the general formula (1) preferably represents an ethyl group, a methyl group, or an isopropyl group from the viewpoint of further improving the temperature responsiveness. In addition, $R^3$ in the general formula (1) and $R^5$ in the general formula (3) or the general formula (4) each preferably represent a hydrogen atom from the viewpoint that the production of the thermosensitive polymer gel is facilitated. X in each of the general formulae (1), (3), and (4) may represent a functional group selected from the group consisting of a hydroxy group, a sulfonic acid group, an oxysulfonic acid group, a phosphoric acid group, and an oxyphosphoric acid group so that the above-mentioned molar ratio may be satisfied. Of those functional groups, an oxysulfonic acid group is preferred from the viewpoint of further improving the radical polymerizability of the constituent unit represented by any one of the general formulae (1), (3), and (4). $R^4$ in each of the general formulae (3) and (4) preferably represents a hydroxy group or a sulfonic acid group from the viewpoint of further improving the heat storage density of the material. p in each of the general formulae (3) and (4) preferably represents 1 or 2 from the viewpoint of further improving the heat storage density. q in the general formula (2) preferably represents 1 from the viewpoint of further improving the heat storage density.

The covalent bonding sites in the general formulae (1) to (4) may bond constituent units of the same kind to each other, or may bond constituent units of different kinds to each other; in addition, part of the covalent bonding sites may form a branched structure. The branched structure is not particularly limited.

The heat storage material of this embodiment may be produced by subjecting a polymerizable monomer represented by the following general formula (5):

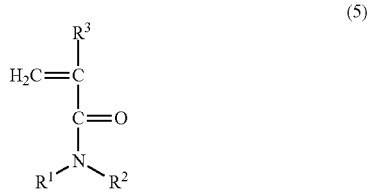

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ may be identical to or different from each other, and $R^3$ represents a hydrogen atom or a methyl group, and a polymerizable monomer represented by the following general formula (7):

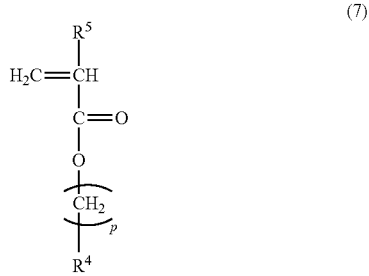

or the following general formula (8):

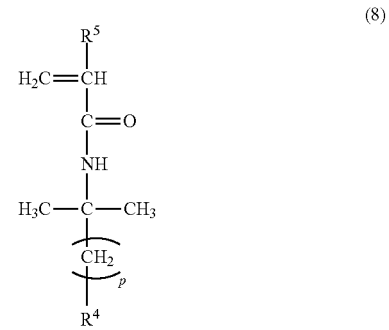

where $R^4$ represents a hydroxy group, a carboxyl group, a sulfonic acid group, or a phosphoric acid group, $R^5$ represents a hydrogen atom or a methyl group, and p represents an integer of from 1 to 3, to radical polymerization in the presence of a crosslinking agent represented by the following general formula (6):

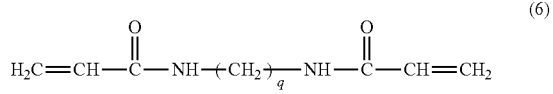

where q represents an integer of from 1 to 3, and one or more kinds of polymerization initiators selected from the group consisting of potassium persulfate, sodium persulfate, ammonium persulfate, potassium perphosphate, and hydrogen peroxide.

The polymerizable monomer represented by the general formula (5), the crosslinking agent represented by the general formula (6), and the polymerization initiator are the same as those described in the second embodiment, and hence their description is omitted. Further, a radical polymerization method, radical polymerization conditions, and the like are the same as those described in the second embodiment, and hence their description is omitted.

Specific examples of the polymerizable monomer represented by the general formula (7) (polymerizable monomer for providing the constituent unit represented by the general formula (3)) include 2-hydroxymethyl acrylate, 2-hydroxyethyl acrylate, 2-hydroxypropyl acrylate, 2-carboxymethyl acrylate, 2-carboxyethyl acrylate, 2-carboxypropyl acrylate, 2-sulfomethyl acrylate, 2-sulfoethyl acrylate, 2-sulfopropyl acrylate, 2-phosphomethyl acrylate, 2-phosphoethyl acrylate, and 2-phosphopropyl acrylate. Of those, 2-hydroxymethyl acrylate, 2-hydroxyethyl acrylate, and 2-hydroxypropyl acrylate are preferred.

Specific examples of the polymerizable monomer represented by the general formula (8) (polymerizable monomer for providing the constituent unit represented by the general formula (4)) include N-(1,1-dimethyl-2-hydroxyethyl)acrylamide, N-(1,1-dimethyl-2-hydroxypropyl)acrylamide, N-(1,1-dimethyl-2-hydroxybutyl)acrylamide, 2-acrylamido-2-methylpropanecarboxylic acid, 2-acrylamido-2-methylbutanecarboxylic acid, 2-acrylamido-2-methylpentanecarboxylic acid, 2-acrylamido-2-methylpropanesulfonic acid, 2-acrylamido-2-methylbutanesulfonic acid, 2-acrylamido-2-methylpentanesulfonic acid, 2-acrylamido-2-methylpropanephosphoric acid, 2-acrylamido-2-methylbutanephosphoric acid, and 2-acrylamido-2-methylpentanephosphoric acid. Of those, 2-acrylamido-2-methylpropanesulfonic acid and 2-acrylamido-2-methylpentanesulfonic acid are preferred.

As in the second embodiment, when the radical polymerization is performed by using water as a solvent, the total concentration of the polymerizable monomer represented by the general formula (5), the polymerizable monomer represented by the general formula (7) or the general formula (8), the crosslinking agent represented by the general formula (6), and the polymerization initiator is preferably set to from 2 mol/L to 3 mol/L. When the total concentration is less than 2 mol/L, the heat storage density of the heat storage material to be obtained may reduce. On the other hand, when the total concentration is more than 3 mol/L, the heat storage material to be obtained may not show any LCST.

The moisture content of the heat storage material according to any one of the first to third embodiments, which is not particularly limited, is preferably from 70% to 99% by mass. The moisture content may be determined as follows (loss-on-drying method): the weight of the heat storage material containing moisture is measured at room temperature; then, the heat storage material is loaded into a thermostat, and the moisture is evaporated at a drying temperature of from 60° C. to 120° C.; and when the moisture disappears (no weight loss occurs), the weight of the heat storage material is measured, and the moisture content is determined on the assumption that the amount of the weight loss is the moisture. In addition, the heat storage material according to any one of the first to third embodiments may be made porous. When the heat storage material is made porous, there is an advantage in that its temperature responsiveness is further improved. A method of making the heat storage material porous is, for example, a method including: preparing a mixed solution containing the polymerizable monomer, the crosslinking agent, and the polymerization initiator described above, and a porogen (pore-forming agent); forming a crosslinked structure from the solution through a radical polymerization reaction; and then removing the porogen through washing. When the radical polymerization reaction is performed by using water as a solvent, the porogen is preferably a water-soluble carbohydrate, such as sucrose, maltose, cellobiose, lactose, sorbitol, xylitol, glucose, or fructose. A porogen composition containing any such water-soluble carbohydrate, and polyethylene glycol, polyvinylpyrrolidone, polyvinyl alcohol, or a mixture thereof may be used. In addition, another method of making the heat storage material porous is, for example, a method including removing moisture from its thermo-sensitive polymer containing the moisture through freeze drying.

In addition, the thermo-sensitive polymer in the present invention may be produced by: applying a mixed solution containing at least the polymerizable monomer, the crosslinking agent, and the polymerization initiator described above to a metal surface in a heat storage tank (e.g., a stainless steel-made pipe, a copper-made pipe, a stainless steel-made fin, or an aluminum-made fin); and subjecting the mixed solution to radical polymerization. The mixed solution may contain, for example, an activator for the metal surface or a coupling agent. In addition, the thermo-sensitive polymer in the present invention may be produced by irradiating a coating film of the above-mentioned mixed solution with a radiation.

EXAMPLES

The present invention is specifically described by way of Examples, but is not limited to the following Examples.

Examples 1 to 5 and Comparative Examples 1 to 5

Under a nitrogen atmosphere, the temperature of a raw material aqueous solution whose formulation was shown in Table 1 was increased from room temperature to 50° C. over 1 hour. Thus, a thermo-sensitive polymer was obtained. The polymer was dried, and was then subjected to equilibrium swelling with distilled water to provide a thermo-sensitive polymer gel. After that, the gel was sealed in an aluminum-made airtight container, and its endothermic peak temperature and heat storage density were measured with a differential scanning calorimeter. The results are shown in Table 2.

Abbreviations in Table 1 are as described below.
NIPAM: N-isopropylacrylamide
HMA: 2-hydroxyethyl acrylate
MBA: N,N'-methylenebisacrylamide
KPS: potassium persulfate
TEMED: N,N,N',N'-tetramethylethylenediamine

TABLE 1

|  | NIPAM (mmol/L) | HMA (mmol/L) | MBA (mmol/L) | KPS (mmol/L) | TEMED (mmol/L) |
| --- | --- | --- | --- | --- | --- |
| Example 1 | 2,250 | 0 | 23 | 23 | 34 |
| Example 2 | 2,250 | 0 | 65 | 65 | 34 |
| Example 3 | 1,688 | 563 | 65 | 65 | 34 |
| Example 4 | 1,125 | 1,125 | 65 | 65 | 34 |
| Example 5 | 563 | 1,688 | 65 | 65 | 34 |
| Comparative Example 1 | 600 | 0 | 1 | 1 | 1 |
| Comparative Example 2 | 600 | 0 | 3 | 3 | 1 |
| Comparative Example 3 | 1,688 | 150 | 3 | 3 | 1 |
| Comparative Example 4 | 300 | 300 | 3 | 3 | 1 |
| Comparative Example 5 | 150 | 450 | 3 | 3 | 1 |

TABLE 2

|  | Endothermic peak temperature (° C.) | Heat storage density (J/g) |
| --- | --- | --- |
| Example 1 | 36 | 653 |
| Example 2 | 38 | 820 |
| Example 3 | 45 | 512 |
| Example 4 | 75 | 540 |
| Example 5 | 77 | 844 |
| Comparative Example 1 | 32 | 40 |
| Comparative Example 2 | 32 | 42 |
| Comparative Example 3 | 40 | 31 |
| Comparative Example 4 | 65 | 38 |
| Comparative Example 5 | 68 | 41 |

As can be seen from the results of Table 2, each of the thermo-sensitive polymer gels obtained in Examples 1 to 5 had an endothermic peak temperature as low as from 36° C. to 77° C., and had a heat storage density as large as from 512 J/g to 844 J/g. That is, each of the thermo-sensitive polymer gels obtained in Examples 1 to 5 can express a heat storage density as high as from 512 J/g to 844 J/g at a heat storage operation temperature as low as from 36° C. to 77° C. In addition, in the process in which the hydrophilicity and hydrophobicity of each of the thermo-sensitive polymer gels reversibly changed to each other, water in the thermo-sensitive polymer gel maintained a liquid state without evaporating. In contrast, each of the thermo-sensitive polymer gels obtained in Comparative Examples 1 to 5 had an endothermic peak temperature as low as from 32° C. to 68° C. as in a related-art heat storage material, such as a paraffin, a fatty acid, or a sugar alcohol, but had a heat storage density as significantly small as from 31 J/g to 42 J/g.

The present international application claims priority based on Japanese Patent Application No. 2018-072948 filed on Apr. 5, 2018, the contents of which are incorporated herein by reference in their entirety.

The invention claimed is:

1. A heat storage material, consisting of a thermo-sensitive polymer gel containing:

a constituent unit represented by the formula (1):

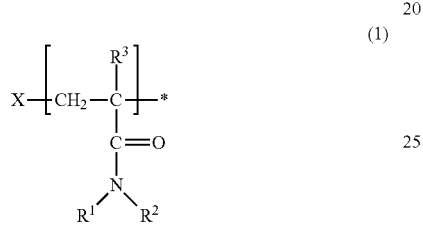

(1)

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ are identical to or different from each other, $R^3$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, and * represents a covalent bonding site; and a constituent unit represented by the formula (2):

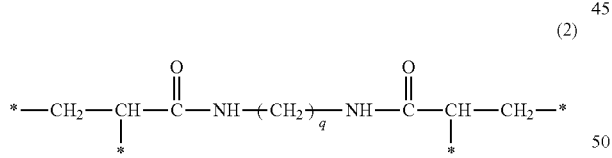

(2)

where * represents a covalent bonding site, and q represents an integer of from 1 to 3, wherein the thermo-sensitive polymer gel has a cross-linked structure in which a covalent bonding site of the constituent unit represented by the formula (1) and a covalent bonding site of the constituent unit represented by the formula (2) are bonded to each other, the thermo-sensitive polymer gel has a molar ratio among the constituent unit represented by the formula (1), X that represents the functional group, and the constituent unit represented by the formula (2) of from 99:0.5:0.5 to 70:23:7, and hydrophilicity and hydrophobicity of the heat storage material reversibly change to each other across a lower critical solution temperature thereof.

2. A heat storage material, consisting of a thermo-sensitive polymer gel containing:

a constituent unit represented by the formula (1):

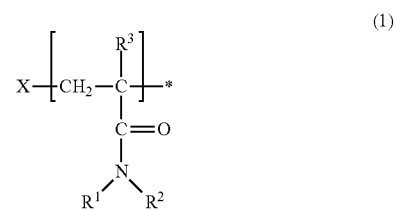

(1)

where $R^1$ represents a hydrogen atom, a methyl group, an ethyl group, a n-propyl group, or an isopropyl group, $R^2$ represents a methyl group, an ethyl group, a n-propyl group, or an isopropyl group, and $R^1$ and $R^2$ are identical to or different from each other, $R^3$ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, and * represents a covalent bonding site;

a constituent unit represented by the formula (2):

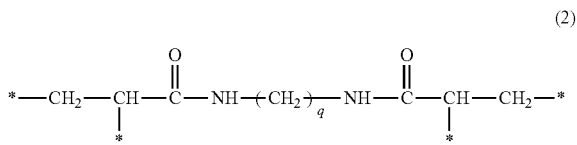

(2)

where * represents a covalent bonding site, and q represents an integer of from 1 to 3; and a constituent unit represented by the formula (3):

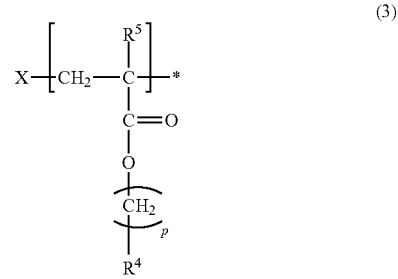

(3)

or the formula (4):

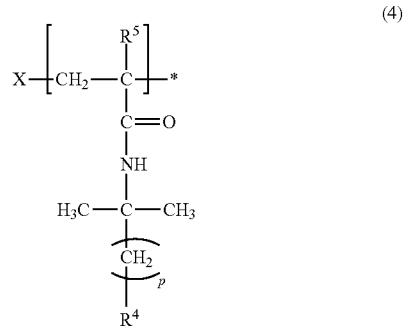

(4)

where R⁴ represents a hydroxy group, a carboxyl group, a sulfonic acid group, or a phosphoric acid group, R⁵ represents a hydrogen atom or a methyl group, X represents a covalent bonding site, or represents one or more kinds of functional groups selected from the group consisting of a hydroxy group, a sulfonic acid group, an oxysulfonic acid group, a phosphoric acid group, and an oxyphosphoric acid group, * represents a covalent bonding site, and p represents an integer of from 1 to 3, wherein the thereto-sensitive polymer gel has a cross-linked structure in which a covalent bonding site of the constituent unit represented by the formula (1), a covalent bonding site of the constituent unit represented by the formula (2), and a covalent bonding site of the constituent unit represented by the formula (3) or the formula (4) are bonded to each other, the thermo-sensitive polymer gel has a molar ratio between the constituent unit represented by the formula (1) and the constituent unit represented by the formula (3) or the formula (4) of from 95:5 to 20:80, the thermo-sensitive polymer gel has a molar ratio among a total of the constituent unit represented by the formula (1) and the constituent unit represented by the formula (3) or the formula (4), Xs that represent the functional groups, and the constituent unit represented by the formula (2) of from 99:0.5:0.5 to 70:23:7, and hydrophilicity and hydrophobicity of the heat storage material reversibly change to each other across a lower critical solution temperature thereof.

3. A method of producing the heat storage material of claim 1, comprising:

subjecting a polymerizable monomer represented by the formula (5):

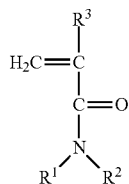

(5)

where R¹ represents a hydrogen atom, a methyl group, an ethyl group, a n-propyl group, or an isopropyl group, R² represents a methyl group, an ethyl group, a n-propyl group, or an isopropyl group, and R¹ and R² are identical to or different from each other, and R³ represents a hydrogen atom or a methyl group, to radical polymerization in the presence of a crosslinking agent represented by the formula (6):

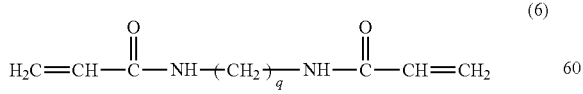

(6)

where q represents an integer of from 1 to 3, and one or more kinds of polymerization initiators selected from the group consisting of potassium persulfate, sodium persulfate, ammonium persulfate, potassium perphosphate, and hydrogen peroxide.

4. A method of producing the heat storage material of claim 2, comprising:

subjecting a polymerizable monomer represented by the formula (5):

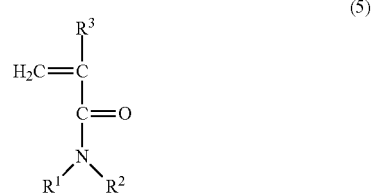

(5)

where R¹ represents a hydrogen atom, a methyl group, an ethyl group, a n-propyl group, or an isopropyl group, R² represents a methyl group, an ethyl group, a n-propyl group, or an isopropyl group, and R¹ and R² are identical to or different from each other, and R³ represents a hydrogen atom or a methyl group, and a polymerizable monomer represented by the formula (7):

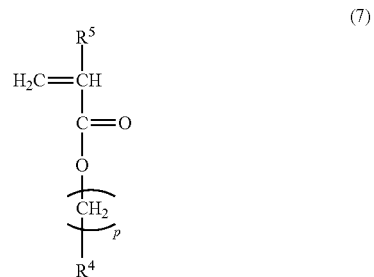

(7)

or the formula (8):

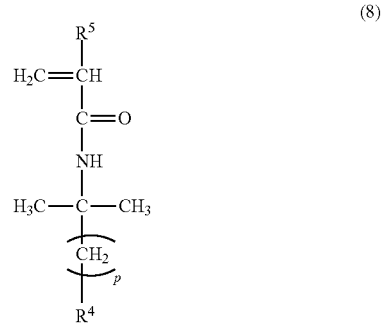

(8)

where R⁴ represents a hydroxy group, a carboxyl group, a sulfonic acid group, or a phosphoric acid group, R⁵ represents a hydrogen atom or a methyl group, and p represents an integer of from 1 to 3, to radical polymerization in the presence of a crosslinking agent represented by the formula (6):

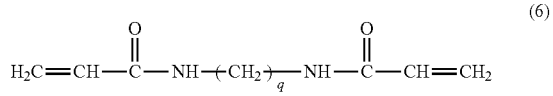

(6)

where q represents an integer of from 1 to 3, and one or more kinds of polymerization initiators selected from the group consisting of potassium persulfate, sodium persulfate, ammonium persulfate, potassium perphosphate, and hydrogen peroxide.

5. The method of producing a heat storage material according to claim 3, wherein the radical polymerization is performed in an aqueous solution having a total concentration of the polymerizable monomer, the crosslinking agent, and the polymerization initiator of from 2 mol/L to 3 mol/L.

6. A heat storage tank, comprising a container filled with the heat storage material of claim 1.

7. The method of producing a heat storage material according to claim 4, wherein the radical polymerization is performed in an aqueous solution having a total concentration of the polymerizable monomer, the crosslinking agent, and the polymerization initiator of from 2 mol/L to 3 mol/L.

8. A heat storage tank, comprising a container filled with the heat storage material of claim 2.

* * * * *